United States Patent Office 2,710,644
Patented June 14, 1955

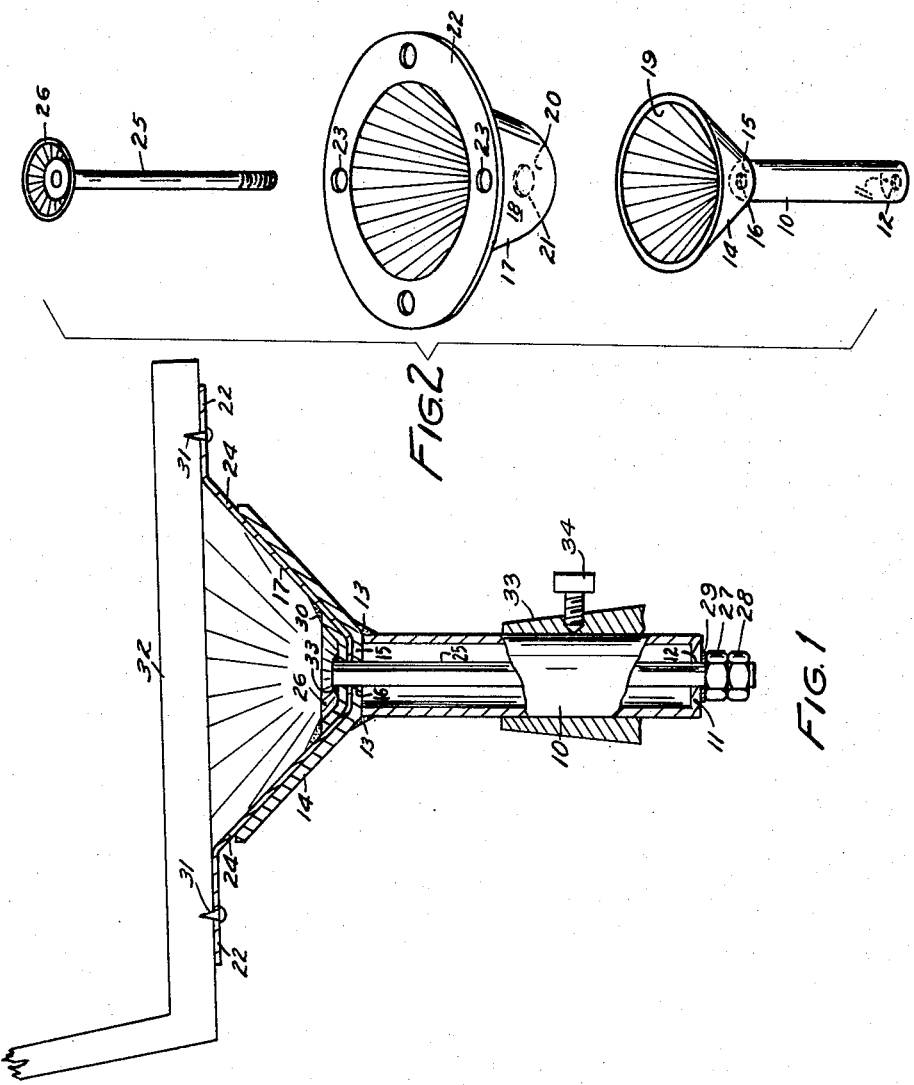

2,710,644

SWIVEL SEAT CONSTRUCTION

Allison F. Krueger, Green Bay, Wis.

Application October 17, 1951, Serial No. 251,657

5 Claims. (Cl. 155—95)

This invention relates generally to a swivel seat construction and more particularly to a chair having nested swivel means.

It is an object of this invention to provide, generally, an improved swivel mounting for a seat.

It is another object of this invention to provide novel nested swivel means.

It is a further object of this invention to provide a seat swivel provided with improved means for maintaining the swivel components operatively centered and fixed against lateral shifting of parts regardless of possible loosened assembling means.

Other objects and many of the attendant advantages of this invention will be readily appreciated as the same becomes better understood by references to the following detailed description when considered in connection with the accompanying drawings in which like reference numerals designate like parts throughout the figures thereof and wherein:

Fig. 1 is an axial sectional view through the swivel structure; and

Fig. 2 is an exploded view of the swivel structure.

Referring now to the drawings, wherein like reference characters designate like or corresponding parts throughout the several views, there is shown in Fig. 1 (which illustrates a preferred embodiment) a tubular supporting post 10 having its lower end closed with an end-wall 11 that is centrally apertured at 12. To the upper end of said post is secured, as by weld 13, an inverted cup-shaped element such as conical element 14, projecting endwise from said post, and having its apex blunted as by flattening as at 15, and centrally apertured as at 16. Said conical element is disposed in axial alignment with its attached supporting post 10. The flattened apex portion 15 of the cone provides, in effect, an upper end-wall closure, centrally apertured, corresponding to the lower end-wall 11.

Disposed snugly in nested relation in said conical element 14 is a similar conical element 17, the outer periphery 18 of conical element 17 being in sliding engagement with the inner periphery 19 of conical element 14. The apex of the conical element 17 is likewise flattened at 20 and centrally apertured at 21, and is disposed in sliding engagement upon the flattened apex portion 15 of conical element 14. Conical element 17 is adapted to rotate in conical element 14.

The outer portion 24 of the conical element 17 extends beyond the end of conical element 14 and is provided with an outwardly projecting flange 22. Said flange lies in a plane at an angle to the axis of its conical element 17 to provide a predetermined tilt to the seat 32 which is adapted to be secured to the flange portion 22 by any means, such as screws 31 passing through openings 23 in said flange.

An assembling bolt 25, having an upswept conical head 26 similar to the contour of the apex of conical element 17 in which said head 26 is snugly disposed and nested, is directed through apertures 21, 16 and 12 in close-fitting relation and holds said swivel components in assembled relation against lateral displacement. Jam nut 27 and lock nut 28 hold the components in assembled relation against relative upward displacement. A washer 29 is interposed between the jam nut 27 and the end-wall 11. While in this the preferred embodiment the head of the assembly bolt 25 is secured to the conical element 17 as by weld 30, it is obvious that it need not be secured thereto, but can remain to function as a free and independent bolt.

It is to be noted that if said nuts become loosened or lost the swivel components are nevertheless retained in operative nested and centered relation, and are restrained against lateral misalignment, one relative to the other, by the bolt and/or the nested relation of the conical elements.

It is obvious that the apexes can be blunted, otherwise than by flattening, such as by making them spherical, ellipsoidal, paraboloidal, and the like.

The post 10 is adapted to be telescopically received in a conventional tubular pedestal 33, only the upper fractional portion thereof being shown, which can be provided with an elevation adjusting nut 34 threaded through the pedestal and engageable with post 10.

The characteristic features of this invention are the nested construction, and the novel arrangement of components operatively centered to preclude lateral displacement despite possible loosening of the assembling bolt.

Obviously many modifications and variations of the present invention are possible in the light of the above teachings. It is therefore to be understood, that within the scope of the appended claims, the invention may be practised otherwise than as specifically described.

What is claimed and desired to be protected by Letters Patent of the United States is:

1. A nested swivel seat construction, comprising: a supporting post having an end comprising a first conical shell element projecting endwise therefrom having its apex portion centrally apertured; a second conical element snugly nested with said first conical element and having its apex centrally apertured; a chair seat mounted on said second conical element, and a pin snugly fitting in said apertures for securing said elements against relative axial displacement.

2. A nested swivel seat construction, comprising: a supporting post having an end comprising a first conical shell element projecting endwise therefrom having its apex portion centrally apertured; a second conical element, having a blunted apex portion, snugly nested with said first conical element and having its blunted apex portion centrally apertured; a chair seat mounted on said second conical element, and a pin snugly fitting in said apertures for securing said elements against relative axial displacement.

3. A nested swivel seat construction, comprising: a supporting post having one end comprising a first conical shell element having a blunted apex portion disposed in axial alignment with said post and having said blunted apex portion centrally apertured; a second similar conical element snugly nested with said first conical element having its blunted apex portion centrally apertured; a chair seat mounted on said second conical element, and a pin snugly fitting in said apertures for securing said elements against relative axial displacement.

4. A nested swivel seat construction, comprising: a supporting post having one end comprising a first inverted conical shell element having a flattened apex portion disposed in axial alignment with said post, said post and said conical element having a longitudinal bore therethrough; a second similar conical shell element snugly nested with said first conical element and rotatable therein and longitudinally bored; a chair seat mounted on said second conical element; and a bolt having its head-end on said second conical element and its body portion snugly fitting in the bores in said elements.

5. A nested swivel seat construction, comprising: a tubular supporting post having its lower end provided with a centrally apertured end-wall, and its upper end comprising a first inverted conical shell element having a flattened apex portion centrally apertured and disposed in axial alignment with said supporting post; a second similar conical shell element snugly received in said first conical element and in rotatable sliding engagement therewith and having its blunted apex portion centrally apertured; a chair seat mounted on said second conical element; an assembling bolt having an inverted conical head snugly received in said second conical element and rigidly secured thereto and having an elongated body portion disposed snugly fitting in said apertures and projecting therebeyond; and means mounted on the projecting end portion of said bolt, engageable with said end-wall, to prevent withdrawal of said bolt.

References Cited in the file of this patent
UNITED STATES PATENTS

| | | |
|---|---|---|
| 1,547,849 | Boogaard et al. | July 28, 1925 |
| 1,906,061 | Hanson | Apr. 25, 1933 |
| 2,629,286 | Burdreck | Feb. 24, 1953 |